United States Patent
Mitsui et al.

(10) Patent No.: US 12,541,003 B2
(45) Date of Patent: Feb. 3, 2026

(54) ESTIMATION APPARATUS AND ESTIMATION METHOD

(71) Applicant: ANRITSU CORPORATION, Kanagawa (JP)

(72) Inventors: Tsutomu Mitsui, Kanagawa (JP); Hirofumi Suganuma, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 284 days.

(21) Appl. No.: 18/392,286

(22) Filed: Dec. 21, 2023

(65) Prior Publication Data

US 2024/0241212 A1    Jul. 18, 2024

(30) Foreign Application Priority Data

Jan. 17, 2023   (JP) ................................. 2023-005294

(51) Int. Cl.
*G01S 5/04*        (2006.01)

(52) U.S. Cl.
CPC ..................... *G01S 5/04* (2013.01)

(58) Field of Classification Search
CPC .......... G01S 5/04; G01S 3/043; G01S 5/0249; H04B 7/086
See application file for complete search history.

(56) References Cited

U.S. PATENT DOCUMENTS

2020/0278418 A1* 9/2020 Lim ..................... H04W 4/029

FOREIGN PATENT DOCUMENTS

WO    WO-03079598 A1 *  9/2003   ........... H04B 7/0615

OTHER PUBLICATIONS

Shougo Matsuo, et al., "Beam Pattern Estimation Based on Radio Map and Multi-beam Antenna Model for 5G Transmitter at 28GHz", IEICE Technical Report RCS2022-120 (Aug. 2022), pp. 132-137. Translation provided as published by IEEE ICOIN 2023.
Yoshio Kunisawa, et al., "A Study of Antenna Directivity Estimation for Dynamic Frequency Sharing", IEICE General Conference 2020, B-17-14, Mar. 2020, p. 524.

* cited by examiner

*Primary Examiner* — Robert W Hodge
*Assistant Examiner* — Bongani Jabulani Mashele
(74) *Attorney, Agent, or Firm* — McDonald Hopkins LLC

(57)  ABSTRACT

The estimation apparatus includes an antenna device that receives beams of a transmission signal transmitted from a base station antenna, as a reception signal at measurement points in a measurement area, a position and azimuth acquisition device that acquires a position and an azimuth of the measurement points at which the antenna device is disposed, a data recording device that records data of the reception signal received by the antenna device disposed at the measurement points, and data of the position and the azimuth of the measurement points acquired by the position and azimuth acquisition device, and a signal processing device that estimates a beam direction and a beam width of the beams from the data of the reception signal and the data of the position and the azimuth of the measurement points, which have been recorded in the data recording device.

5 Claims, 11 Drawing Sheets

ESTIMATION APPARATUS AND ESTIMATION METHOD

TECHNICAL FIELD

The present invention relates to an estimation apparatus and an estimation method of estimating a beam shape of a radio wave transmitted from a base station.

BACKGROUND ART

In recent years, the 5th generation mobile communication system has been operated as a mobile communication system, and the number of compatible portable terminals is increasing. In this mobile communication system, millimeter waves that have high frequencies and can realize ultra-high-speed communication are also used. Millimeter-wave radio waves are characterized by strong linearity, weak to blocking, and large distance attenuation. Therefore, antenna beams formed by a base stations are complicated and include a plurality of beams with narrow beam widths such that the portable terminals can obtain sufficient power for communication. Further, beam shape information such as a beam direction and a beam width of the antenna beam is not disclosed because the beam shape information differs depending on the base station and in order to ensure confidentiality. However, when a new base station is installed, information of antenna beams of the surrounding base stations is required in order to avoid interference with existing systems.

In addition, in a system using radio waves having a frequency lower than that of millimeter waves, communication is possible by diffraction of radio waves even in the shadow of buildings. However, the millimeter waves have high linearity, and thus, a communicable area is limited if the millimeter waves are blocked by the buildings. Therefore, for the purpose of expanding the communicable area, a technique of installing a reflector or the like has been developed. In order to calculate the installation position of the reflector, it is necessary to grasp a parameter such as the beam direction and the beam width of the existing base station antenna.

As a method of estimating a parameter of the antenna beam, there is known a method for performing estimation in a manner that a radio map is constructed, whether observation data is line-of-sight or non-line-of-sight is determined by using the Fresnel zone and a height map to select measurement data in the line-of-sight, and the weighted average is calculated (for example, see Non-Patent Document 1). In addition, as another estimation method, a method using a correlation coefficient between a received power distribution measured by disposing a wireless sensor in the field and an estimated power distribution obtained by calculation is known (for example, see Non-Patent Document 2).

RELATED ART DOCUMENT

Patent Document

[Non-Patent Document 1] "Beam Pattern Estimation Based on Radio Map and Multi-beam Antenna Model for 5G Transmitter at 28 GHz", Shougo MATSUO, Hirofumi NAKAJO, Sunao MIYAMOTO, Fujii TAKEO, and Kenji WAKAFUJI, IEICE Technical Report RCS2022-120 (2022-08)

[Non-Patent Document 2] "A Study of Antenna Directivity Estimation for Dynamic Frequency Sharing", Yoshio KUNISAWA, Hiroki MATSUNO, Takahiro HAYASHI, Yoshiaki AMANO, IEICE General Conference 2020, B-17-14, March 2020

DISCLOSURE OF THE INVENTION

Problem that the Invention is to Solve

However, the conventional methods disclosed in Non-Patent Documents 1 and 2 require pre-calculation using a 3D map or the like for each area to be estimated. The 3D map and the like required for the pre-calculation may be updated as needed, but it is assumed that the 3D map is different from a map at the time of measurement in the field, and there is a possibility that a large error occurs.

The present invention has been made to solve such conventional problems, and an object of the present invention is to provide an estimation apparatus and an estimation method capable of estimating a beam direction and a beam width of a beam transmitted from a base station antenna without pre-calculation using a map.

Means for Solving the Problem

In order to solve the above problems, according to the present invention, an estimation apparatus is configured to include an antenna device that includes a plurality of antenna elements and receives a plurality of beams of a transmission signal transmitted from a base station antenna as a reception signal by the plurality of antenna elements at a plurality of measurement points in a measurement area, a position and azimuth acquisition device that acquires a position and an azimuth of each of the measurement points at which the antenna device is disposed, a data recording device that records data of the reception signal received by the antenna device disposed at each of the measurement points and data of the position and the azimuth of each of the measurement points acquired by the position and azimuth acquisition device, and a signal processing device that estimates a beam direction and a beam width of each of the beams from the data of the reception signal and the data of the position and the azimuth of each of the measurement points, which have been recorded in the data recording device. The signal processing device includes a reference signal extraction unit that extracts a reference signal included in the reception signal, a channel response generation unit that generates a channel response of each of the beams from a known reference signal included in the transmission signal and the reference signal extracted from the reception signal by the reference signal extraction unit, an arrival direction estimation unit that estimates an arrival direction of each of the beams with a highest power level, for each of the measurement points, based on the channel response of each of the beams generated by the channel response generation unit, a base station position estimation unit that estimates a position of the base station antenna by using the arrival direction estimated by the arrival direction estimation unit, a reception power calculation unit that calculates reception power of the plurality of antenna elements at each of the measurement points, a power distribution calculation unit that calculates a maximum-value position and a beam boundary based on the position of each of the measurement points, the position of the base station antenna estimated by the base station position estimation unit, and the reception power calculated by the reception power calculation unit, the maximum-value position being a position at which a power distribution of each of the beams has a maximum value in the measurement area, and the beam boundary being a position at which a value of the power distribution is lower than the maximum value by 3 dB, a beam direction estimation unit that estimates the beam direction of each of the beams based on the position of the base station antenna estimated by the base station position estimation unit and the maximum-value position of each of the beams calculated by the power distribution calculation unit, and a beam width estimation unit that estimates the beam width of each of the beams based on the beam boundary of each of the beams calculated by the power distribution calculation unit.

Further, the estimation apparatus according to the present invention may have a configuration in which the antenna device and the position and azimuth acquisition device are loaded on a drone, and the antenna device and the position and azimuth acquisition device each are connected to the data recording device by wireless communication.

Further, the estimation apparatus according to the present invention may have a configuration in which the antenna device, the position and azimuth acquisition device, and the data recording device are loaded on a drone, and the data recording device and the signal processing device are connected by wireless communication.

Further, in the estimation apparatus according to the present invention, the plurality of measurement points in the measurement area may be located at positions of grid points provided in a grid pattern.

With this configuration, the estimation apparatus according to the present invention can estimate an arrival direction of a direct wave of a transmission signal from a base station antenna, and thus can estimate a beam direction and a beam width of a beam transmitted from the base station antenna without pre-calculation using a map.

Further, according to the present invention, there is provided an estimation method using an estimation apparatus including an antenna device that includes a plurality of antenna elements and receives a plurality of beams of a transmission signal transmitted from a base station antenna as a reception signal by the plurality of antenna elements at a plurality of measurement points in a measurement area, a position and azimuth acquisition device that acquires a position and an azimuth of each of the measurement points at which the antenna device is disposed, a data recording device that records data of the reception signal received by the antenna device disposed at each of the measurement points and data of the position and the azimuth of each of the measurement points acquired by the position and azimuth acquisition device, and a signal processing device that estimates a beam direction and a beam width of each of the beams from the data of the reception signal and the data of the position and the azimuth of each of the measurement points, which have been recorded in the data recording device. The estimation method includes a reference signal extraction step of extracting a reference signal included in the reception signal, a channel response generation step of generating a channel response of each of the beams from a known reference signal included in the transmission signal and the reference signal extracted from the reception signal in the reference signal extraction step, an arrival direction estimation step of estimating an arrival direction of each of the beams with a highest power level, for each of the measurement points, based on the channel response of each of the beams generated in the channel response generation step, a base station position estimation step of estimating a position of the base station antenna by using the arrival direction estimated in the arrival direction estimation step, a reception power calculation step of calculating reception power of the plurality of antenna elements at each of the measurement points, a power distribution calculation step of calculating a maximum-value position and a beam boundary based on the position of each of the measurement points, the position of the base station antenna estimated in the base station position estimation step, and the reception power calculated in the reception power calculation step, the maximum-value position being a position at which a power distribution of each of the beams has a maximum value in the measurement area, and the beam boundary being a position at which a value of the power distribution is lower than the maximum value by 3 dB, a beam direction estimation step of estimating the beam direction of each of the beams based on the position of the base station antenna estimated in the base station position estimation step and the maximum-value position of each of the beams calculated in the power distribution calculation step, and a beam width estimation step of estimating the beam width of each of the beams based on the beam boundary of each of the beams calculated in the power distribution calculation step.

Advantage of the Invention

The present invention provides an estimation apparatus and an estimation method capable of estimating a beam direction and a beam width of a beam transmitted from a base station antenna without pre-calculation using a map.

BRIEF DESCRIPTION OF THE DRAWINGS

FIG. 3A is a perspective view and FIG. 3B is a plan view.

BEST MODE FOR CARRYING OUT THE INVENTION

Hereinafter, an embodiment of an estimation apparatus and an estimation method according to the present invention will be described with reference to the accompanying drawings.

Figure 1:
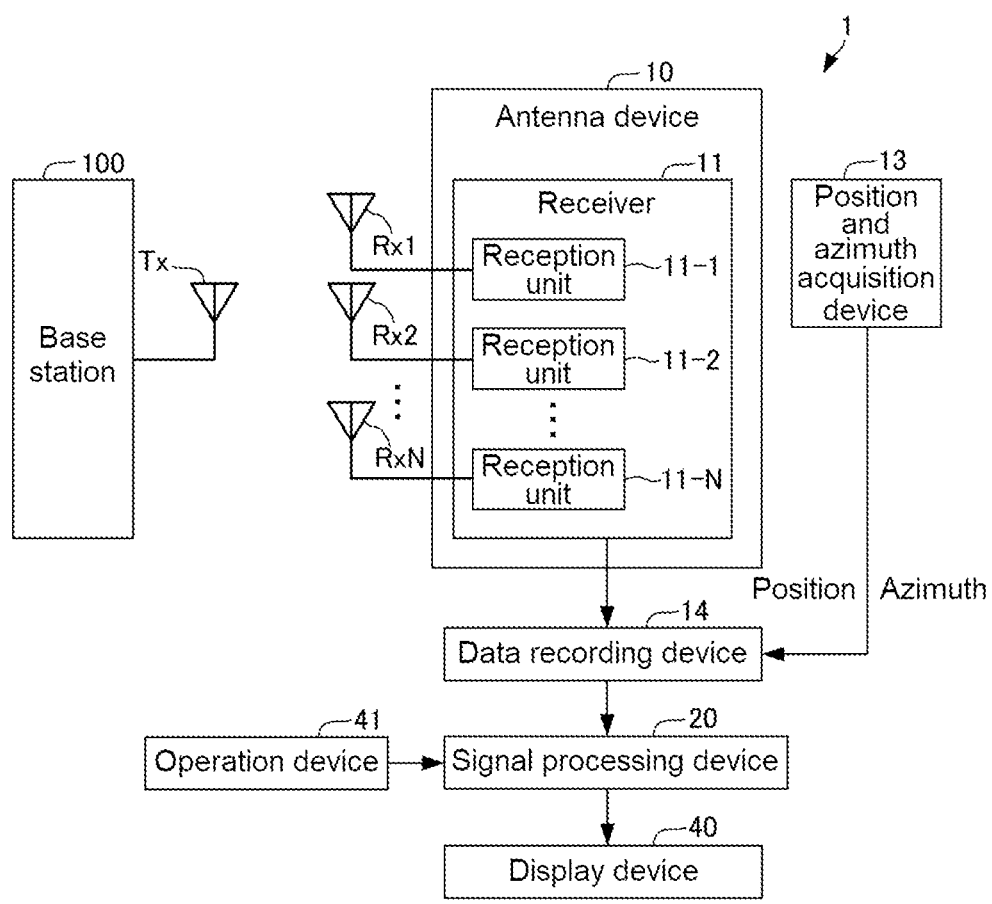
FIG. 1 is a diagram illustrating a configuration of an estimation apparatus according to an embodiment of the present invention.

As illustrated in FIG. 1, an estimation apparatus 1 in the present embodiment includes an antenna device 10, a position and azimuth acquisition device 13, a data recording device 14, a signal processing device 20, a display device 40, an operation device 41. The respective devices are connected to each other by wireless communication or wired communication.

Figure 2A:
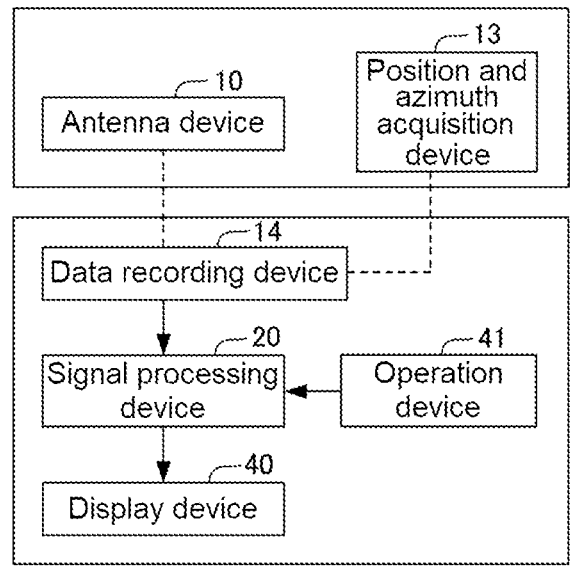
FIG. 2A illustrates an example in which an antenna device and a position and azimuth acquisition device are configured as an integrated device in the estimation apparatus according to the embodiment of the present invention.

FIG. 2A illustrates a configuration in which the antenna device 10 and the position and azimuth acquisition device 13 are configured as an integrated device that can be loaded on a drone or the like, the antenna device 10 and the position and azimuth acquisition device 13 each are connected to the data recording device 14 by wireless communication, and the data recording device 14 and the signal processing device 20 are connected to each other by wired communication. The data recording device 14 and the signal processing device 20 may be configured in a cloud server.

Figure 2B:
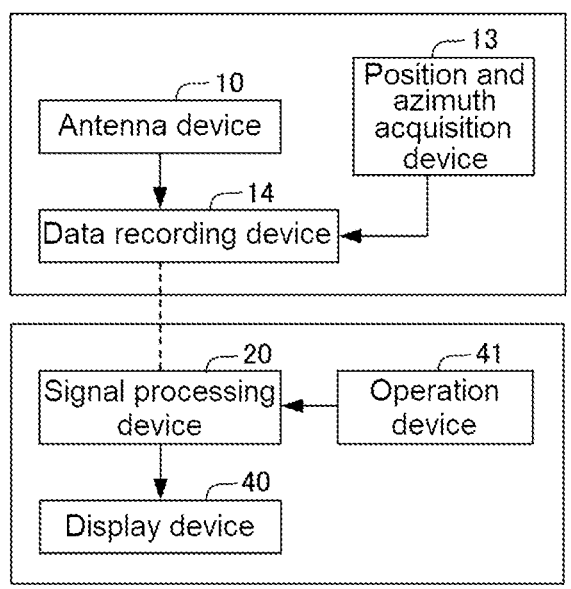
FIG. 2B illustrates an example in which the antenna device, the position and azimuth acquisition device, and a data recording device are configured as an integrated device in the estimation apparatus according to the embodiment of the present invention.

FIG. 2B illustrates a configuration in which the antenna device 10, the position and azimuth acquisition device 13, and the data recording device 14 are configured as an integrated device that can be loaded on a drone or the like, the antenna device 10 and the position and azimuth acquisition device 13 each are connected to the data recording device 14 by wired communication, and the data recording device 14 and the signal processing device 20 are connected to each other by wireless communication. The signal processing device 20 may be configured in a cloud server.

The antenna device 10 receives a plurality of beams of a transmission signal transmitted from a base station antenna Tx of a base station 100 at a plurality of measurement points 30 (see FIG. 4) in a measurement area MA. The antenna device 10 includes a receiver 11 including a plurality of N antenna elements Rx1 to RxN that receive the transmission signal transmitted from the base station antenna Tx as a reception signal, and reception units 11-1 to 11-N of which the number is similar to the number of the plurality of N antenna elements Rx1 to RxN. Each of the antenna elements Rx1 to RxN is, for example, a planar antenna such as a microstrip antenna.

Each of the reception units 11-1 to 11-N executes a reception process such as amplification, frequency conversion, and analog-to-digital conversion on the reception signal (wireless signal) received by the corresponding antenna elements Rx1 to RxN. The number of reception units 11-1 to 11-N may be less than the number of the antenna elements Rx1 to RxN. In this case, any configuration may be used as long as the antenna elements Rx1 to RxN can be switched by a switch or the like to be connected to each of the reception units 11-1 to 11-N.

Figure 3A:
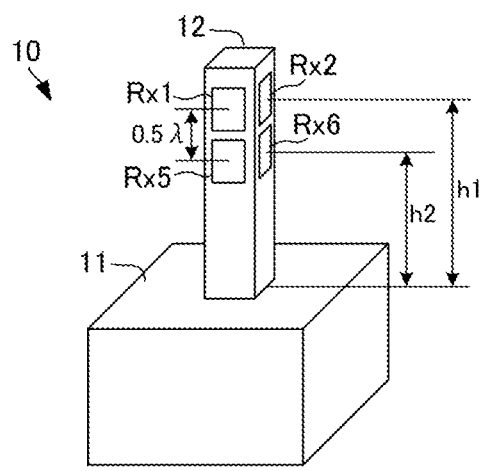
FIGS. 3A and 3B are schematic diagrams illustrating a configuration of the antenna device.
Figure 3B:
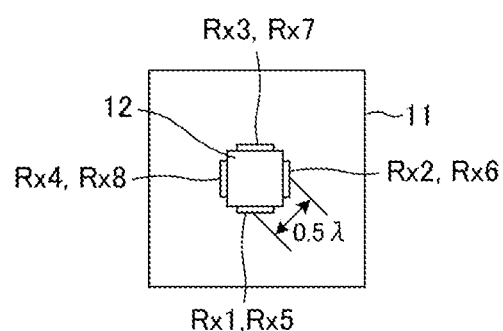

FIGS. 3A and 3B are schematic diagrams illustrating a configuration example of the antenna device 10. In the example of FIGS. 3A and 3B, N=8, and four antenna elements Rx1 to Rx4 at a height h1 and four antenna elements Rx5 to Rx8 at a height h2 are provided on the four side surfaces of a square column 12.

As illustrated in FIG. 3A, the set of four antenna elements Rx1 to Rx4 and the set of four antenna elements Rx5 to Rx8 are arranged to be separated from each other by 0.5λ in a height direction. Further, as illustrated in FIG. 3B, the four antenna elements Rx1 to Rx4 are arranged such that the center positions of the adjacent antenna elements are separated from each other by 0.5λ in a horizontal direction. Similarly, the four antenna elements Rx5 to Rx8 are arranged such that the center positions of the adjacent antenna elements are separated from each other by 0.5λ in the horizontal direction. Here, λ is the wavelength of a millimeter wave beam transmitted from the base station antenna Tx.

Figure 4:
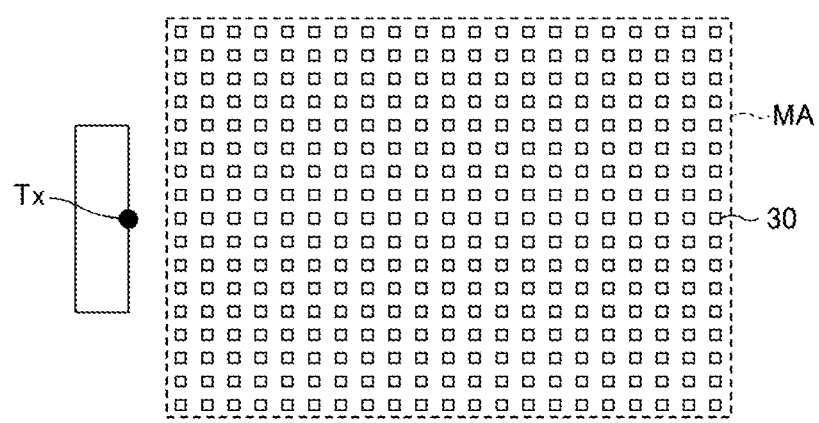
FIG. 4 is a diagram illustrating an example of a positional relationship between a base station antenna and a plurality of measurement points.

FIG. 4 illustrates an example positional relationship between the base station antenna Tx and the plurality of measurement points 30. A black circle in FIG. 4 indicates the position of the base station antenna Tx, and a white square indicates the position of each measurement point 30. For example, when the beam transmitted from the base station antenna Tx is a millimeter wave, the plurality of measurement points 30 may be provided in a range of 100 m×100 m, which is assumed to be a communication area. The antenna device 10 is disposed, for example, such that each measurement point 30 coincides with an intermediate position between the center position of the set of four antenna elements Rx1 to Rx4 and the center position of the set of four antenna elements Rx5 to Rx8.

The position and azimuth acquisition device 13 is a device that acquires the position and the azimuth of each measurement point 30 in which the antenna device 10 is disposed. The position and azimuth acquisition device 13 is configured by, for example, a global positioning system (GPS) compass that acquires the azimuth of the measurement point 30 from the relative positional relationship between two GPS antennas and acquires the position of the measurement point 30. The position and azimuth acquisition device 13 is not limited to the GPS compass, as long as the position and azimuth acquisition device 13 can acquire the positions and the azimuths of the plurality of measurement points 30. The position and azimuth acquisition device 13 may be an electronic compass, a gyrocompass, a quantum sensor, or the like.

The data recording device 14 is a device including a storage that records data of a reception signal subjected to the reception process by the antenna device 10 disposed at each measurement point 30 and data of the position and the azimuth of each measurement point 30, which has been acquired by the position and azimuth acquisition device 13.

The signal processing device 20 is a device that estimates a beam direction and a beam width of a beam of the transmission signal transmitted from the base station antenna Tx, from the above pieces of data (the data of the reception signal and the data of the position and the azimuth of each measurement point 30) recorded in the data recording device 14.

Figure 5:
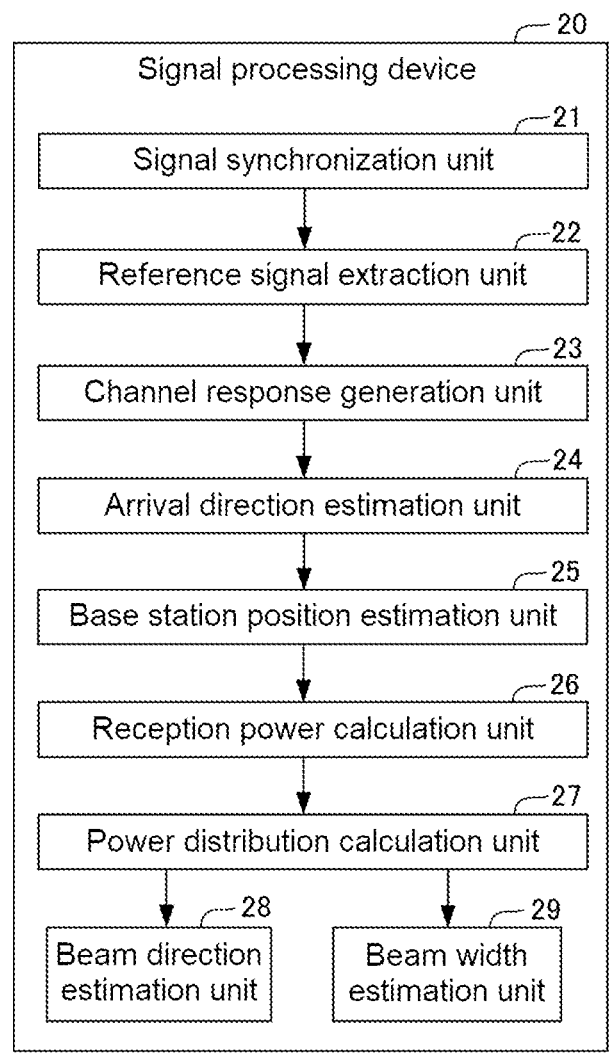
FIG. 5 is a block diagram illustrating a configuration of a signal processing device in the estimation apparatus according to the embodiment of the present invention.

As illustrated in FIG. 5, the signal processing device 20 includes a signal synchronization unit 21, a reference signal extraction unit 22, a channel response generation unit 23, an arrival direction estimation unit 24, a base station position estimation unit 25, a reception power calculation unit 26, a power distribution calculation unit 27, a beam direction estimation unit 28, and a beam width estimation unit 29.

The signal synchronization unit 21 performs at least one of time domain synchronization (timing synchronization of symbols, slots, and the like) and frequency domain synchronization (compensation for carrier frequency offset) on the reception signal subjected to the reception process by the antenna device 10, by using a synchronization signal included in the reception signal subjected to the reception process by the antenna device 10 and the corresponding known synchronization signal. For example, in the case of the 5G New Radio (NR) standard, at least one of a primary synchronization signal (PSS) included in an SS/PBCH block (synchronization signal/physical broadcast channel block: SSB) and a secondary synchronization signal (SSS) is used as the synchronization signal in the signal synchronization unit 21.

Also, the signal synchronization unit 21 acquires an SSB index for identifying the SSB based on a PBCH included in the SSB of the reception signal. Since the SSB index has a one-to-one correspondence with the beam radiated from the base station antenna Tx, the signal synchronization unit 21 can specify which beam radiated from the base station antenna Tx the reception signal corresponds to.

The reference signal extraction unit 22 extracts a reference signal included in the reception signal synchronized by the signal synchronization unit 21. For example, in the case of the 5G NR standard, reference signals such as a channel state information reference signal (CSI-RS), a demodulation reference signal (DM-RS), a tracking reference signal (TRS), and a phase tracking reference signal (PT-RS) are extracted by the reference signal extraction unit 22.

The channel response generation unit 23 generates a channel response of each beam radiated from the base station antenna Tx for each measurement point 30, from the known reference signal included in the transmission signal transmitted from the base station antenna Tx and the reference signal extracted from the reception signal by the reference signal extraction unit 22. The channel response includes information of an amplitude variation amount and a phase variation amount of the reference signal extracted from the reception signal with respect to the known reference signal. For example, in the case of the 5G NR standard, the reference signals such as a CSI-RS, a DM-RS, a TRS, and a PT-RS extracted from the reception signal by the reference signal extraction unit 22, and the corresponding known reference signals are used to generate a channel response by the channel response generation unit 23.

Based on the channel response of each beam at each measurement point 30, which has been generated by the channel response generation unit 23, the arrival direction estimation unit 24 calculates arrival direction characteristics of each beam of the transmission signal from the base station antenna Tx for each measurement point 30, and estimates an arrival direction in which the power level in the calculated arrival direction characteristics of each beam is highest, for each measurement point 30. That is, the arrival direction estimation unit 24 estimates the arrival direction of a direct wave of the transmission signal from the base station antenna Tx. For example, the arrival direction estimation unit 24 may perform arrival direction estimation using a well-known beamformer, a multiple signal classification (MUSIC) method, or an algorithm such as a fast iterative shrinkage-thresholding algorithm (FISTA).

Specifically, the arrival direction estimation unit 24 calculates an azimuth angle dependency of each beam of the transmission signal from the base station antenna Tx on the arrival direction by using the set of four antenna elements Rx1 to Rx4 or the set of four antenna elements Rx5 to Rx8 for each measurement point 30, and estimates, for each measurement point 30, an azimuth angle indicating the highest power level in the calculated azimuth angle dependency.

In addition, the arrival direction estimation unit 24 calculates, for each measurement point 30, an elevation/depression angle dependency of each beam of the transmission signal from the base station antenna Tx on the arrival direction by using the set of four antenna elements Rx1 to Rx4, and estimates, for each measurement point 30, an elevation/depression angle indicating the highest power level in the calculated elevation/depression angle dependency. Similarly, the arrival direction estimation unit 24 calculates, for each measurement point 30, an elevation/depression angle dependency of each beam of the transmission signal from the base station antenna Tx on the arrival direction by using the set of four antenna elements Rx5 to Rx8, and estimates, for each measurement point 30, an elevation/depression angle indicating the highest power level in the calculated elevation/depression angle dependency.

The base station position estimation unit 25 estimates the position of the base station antenna Tx by using the arrival direction of each beam at each measurement point 30, which has been estimated by the arrival direction estimation unit 24. When estimating the position of the base station antenna Tx, the base station position estimation unit 25 may use the arrival directions obtained at all the measurement points 30, or may use the arrival directions obtained at some of the measurement points 30.

Figure 6:
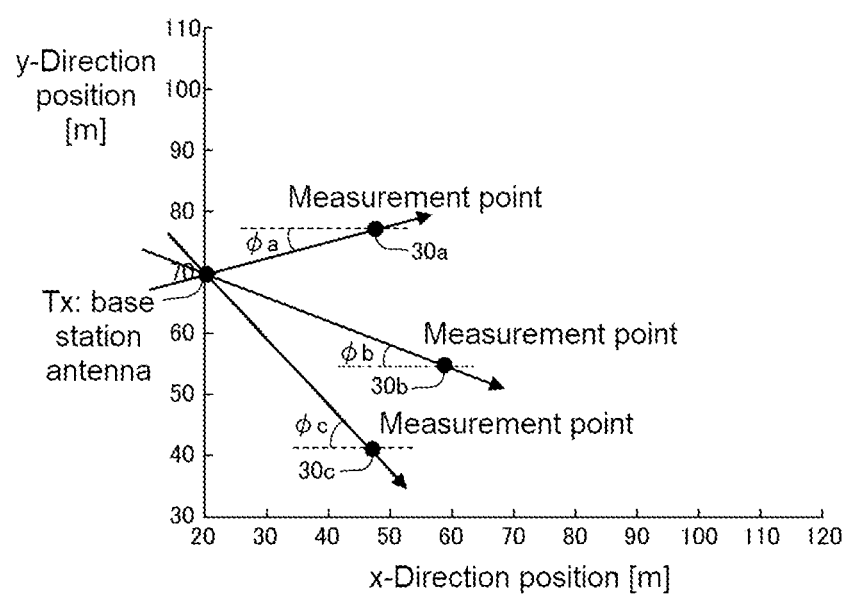
FIG. 6 is a diagram for describing an estimation method for a position of the base station antenna by the signal processing device.

FIG. 6 is a diagram for describing an estimation method of the position of the base station antenna Tx in the horizontal plane (the xy plane on which the plurality of measurement points 30 are arranged) by the base station position estimation unit 25. FIG. 6 illustrates some arrival directions estimated by the arrival direction estimation unit 24 using the FISTA that is one type of compressed sensing.

As illustrated in FIG. 6, for example, the base station position estimation unit 25 estimates the position of an intersection of straight lines (arrows in FIG. 6) in the xy plane defined by azimuth angles φa, φb, and φc of the arrival directions at three measurement points 30a, 30b, and 30c, to be a position of the base station antenna Tx in the xy plane. When the straight lines of the arrival directions at the measurement points 30 do not intersect at one point, the base station position estimation unit 25 estimates the center of gravity of a polygon formed by the intersections to be the position of the base station antenna Tx in the xy plane.

The estimation result of the base station position in the xy plane by the base station position estimation unit 25 is obtained from the set of four antenna elements Rx1 to Rx4 disposed at the same height h1 in the antenna device 10, or the set of four antenna elements Rx5 to Rx8 disposed at the same height h2 in the antenna device 10.

In addition, when the height direction is set as a z-axis direction, the base station position estimation unit 25 can estimate the base station position in a vertical plane (a plane perpendicular to the xy plane) including the measurement point 30, that is, the height of the base station antenna Tx. The estimation result of the height of the base station antenna Tx by the base station position estimation unit 25 is obtained, for example, in a manner that the position of the intersection is obtained in a similar manner to the estimation method of the base station position in the xy plane, by using the elevation/depression angle of the arrival direction obtained from the set of four antenna elements Rx1 to Rx4 and the elevation/depression angle of the arrival direction obtained from the set of four antenna elements Rx5 to Rx8. In the antenna device 10, when another set of antenna elements is further provided at a height different from those of the set of four antenna elements Rx1 to Rx4 and the set of four antenna elements Rx5 to Rx8, the base station position estimation unit 25 obtains the position of an intersection (or the center of gravity of a polygon) by also using the elevation/depression angle obtained from the other set of antenna elements. In this manner, the estimation result of the height of the base station antenna Tx is obtained.

The reception power calculation unit 26 calculates the maximum reception power $P_r$ among the plurality of antenna elements Rx1 to RxN at each measurement point 30.

The power distribution calculation unit 27 calculates a power distribution $P_a$ of each beam in the measurement area MA based on the position of each measurement point 30 acquired by the position and azimuth acquisition device 13, the position of the base station antenna Tx estimated by the base station position estimation unit 25, and the reception power $P_r$ calculated by the reception power calculation unit 26.

More specifically, the power distribution calculation unit 27 calculates a distance d from the position of the base station antenna Tx estimated by the base station position estimation unit 25 to each measurement point 30, and calculates a free space path loss (FSPL) [dB] according to the following Expression (1) by using the calculated distance d and the wavelength A of the beam transmitted from the base station antenna Tx.

$$FSPL(d) = 10 \log\left(\frac{4\pi d}{\lambda}\right)^2 \quad (1)$$

The reception power $P_r$ [dBm] at each measurement point 30 is represented by the following Expression (2). Here, $G_t$ [dBi] is an antenna gain of the base station antenna Tx. $G_r$ [dBi] is an antenna gain of the plurality of antenna elements Rx1 to RxN, and $P_t$ [dBm] is transmission power of the base station antenna Tx.

$$P_r = G_t + G_r + P_t - FSPL(d) \quad (2)$$

Then, the power distribution calculation unit 27 calculates a power distribution $P_a$ of each beam in the measurement area MA by subtracting the known antenna gain $G_r$ of the plurality of antenna elements Rx1 to RxN from the reception power $P_r$ obtained at each measurement point 30, and compensating for the FSPL, as shown in the following Expression (3). Here, the transmission power $P_t$ is assumed to be constant.

$$P_a = G_t + P_t = P_r + FSPL(d) - G_r \quad (3)$$

Figure 7A:
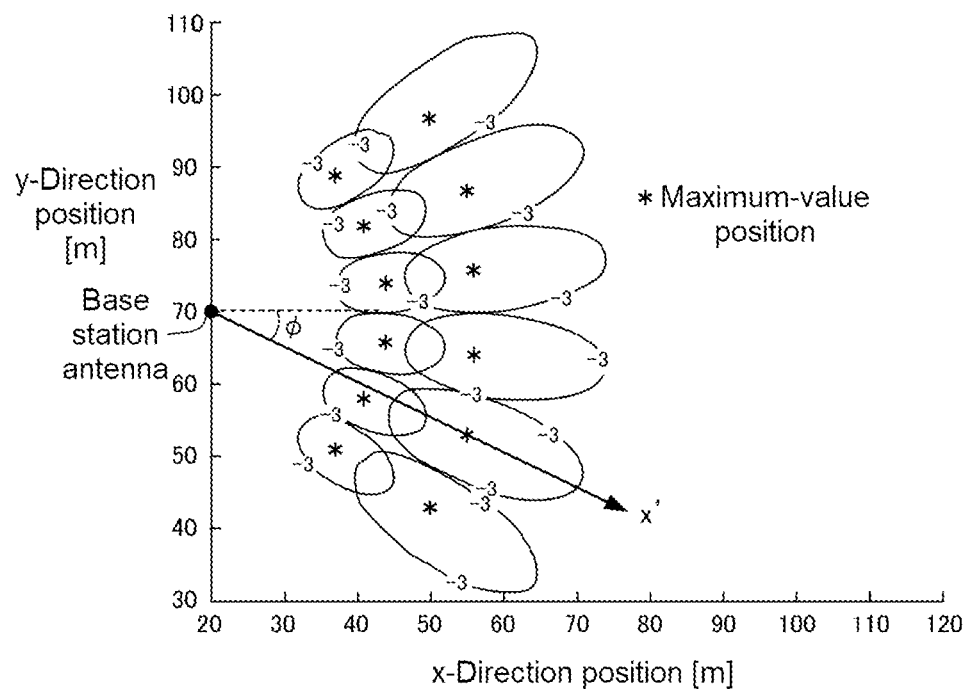
FIG. 7A is a graph showing a position of a maximum value of a power distribution of a beam transmitted from the base station antenna and a position of −3 dB from the maximum value.

Then, the power distribution calculation unit 27 calculates the position at which the power distribution $P_a$ of each beam in the measurement area MA has the maximum value (referred to as a "maximum-value position" below) by interpolation. Further, the power distribution calculation unit 27 calculates the position of −3 dB from the maximum value of the power distribution $P_a$ (referred to as a "beam boundary" below) by interpolation. FIG. 7A illustrates curves in which, when the number of beams transmitted from the base station antenna Tx is 12, the maximum-value position of the power distribution $P_a$ of each beam obtained by the power distribution calculation unit 27 is indicated by *, and the position of −3 dB from the maximum value is represented by −3. This curve is also be referred to as a 3 dB curve below.

The beam direction estimation unit 28 estimates the beam direction of each beam based on the position of the base station antenna Tx estimated by the base station position estimation unit 25 and the maximum-value position of each beam calculated by the power distribution calculation unit 27. The beam direction is indicated by an azimuth angle and an elevation/depression angle viewed from the base station antenna Tx.

As illustrated in FIG. 7A, the beam direction estimation unit 28 estimates an azimuth angle φ of the maximum-value position in the power distribution $P_a$ of each beam viewed from the base station antenna Tx. In FIG. 7A, an x'-axis is taken in a direction connecting the position of the base station antenna Tx projected onto the xy plane and the maximum-value position of the power distribution $P_a$ of the beam that attracts attentions. At this time, an angle formed by the x'-axis and the x-axis is the azimuth angle φ.

Figure 7B:
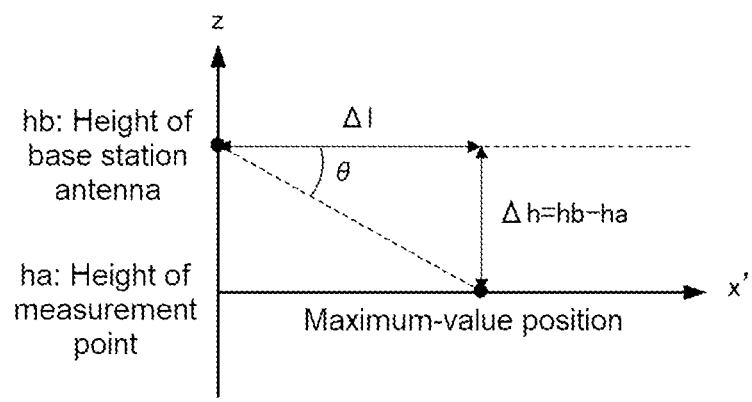
FIG. 7B is a graph showing an elevation/depression angle θ of a beam of a transmission signal.

Also, as illustrated in FIG. 7B, the beam direction estimation unit 28 calculates the elevation/depression angle θ of the beam of the transmission signal by a difference in the horizontal/vertical distance between the position of the base station antenna Tx and the maximum-value position of the power distribution $P_a$ of each beam.

Here, a difference Δh in a vertical distance is represented by a difference between a height hb of the base station antenna Tx and a height ha of the measurement point 30. Further, a difference Δl in a horizontal distance is represented by a distance between the position of the base station antenna Tx projected on the xy plane and the maximum-value position of the power distribution $P_a$ of the beam that attracts attentions. That is, the elevation/depression angle θ is obtained by a tan (Δh/Δl). Regarding the height of the xy plane in which the plurality of measurement points 30 are arranged, the similar elevation/depression angle θ can be obtained at any height as long as the sufficient reception power can be obtained at this height.

The beam width estimation unit 29 estimates the beam width of the beam of the transmission signal based on the beam boundary of each beam calculated by the power distribution calculation unit 27. An estimation method of the beam width by the beam width estimation unit 29 will be described below.

First, the beam width estimation unit 29 fits data of the 3 dB curve of the power distribution $P_a$ calculated by the power distribution calculation unit 27 to an ellipse to obtain a short-axis radius a and a long-axis radius b. The least squares method can be used for this fitting, but other algorithms may be used.

Figure 8:
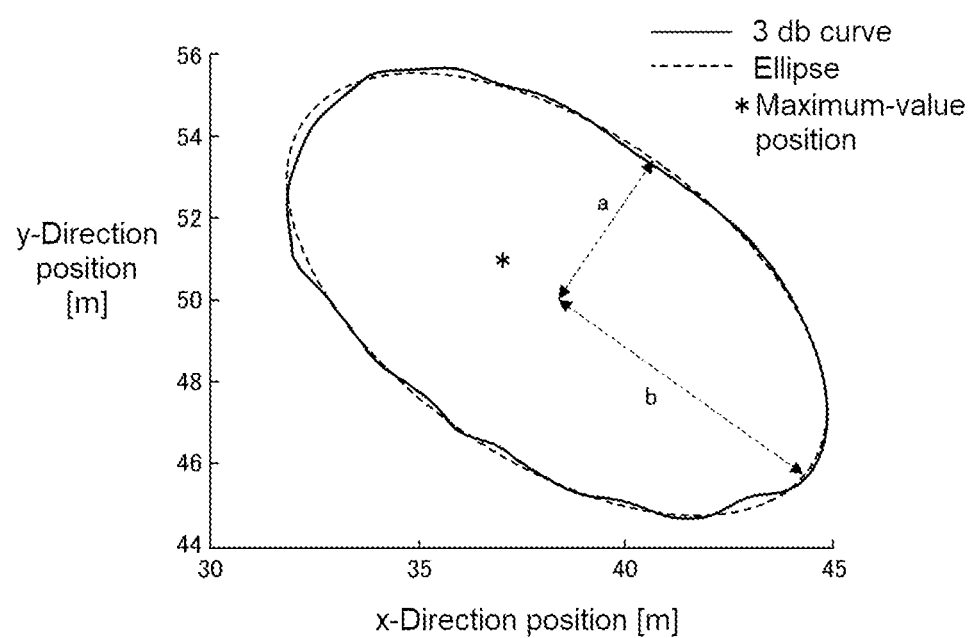
FIG. 8 is a graph showing a fitting example of the beam transmitted from the base station antenna.

FIG. 8 illustrates a fitting example by the beam width estimation unit 29. In FIG. 8, the solid line represents the 3 dB curve of the power distribution $P_a$ and the dashed line represents the ellipse fitted to the 3 dB curve. It is understood from FIG. 8 that the 3 dB curve is well fitted to the ellipse. * in FIG. 8 indicates the maximum-value position of the power distribution $P_a$ obtained by the power distribution calculation unit 27.

Figure 9A:
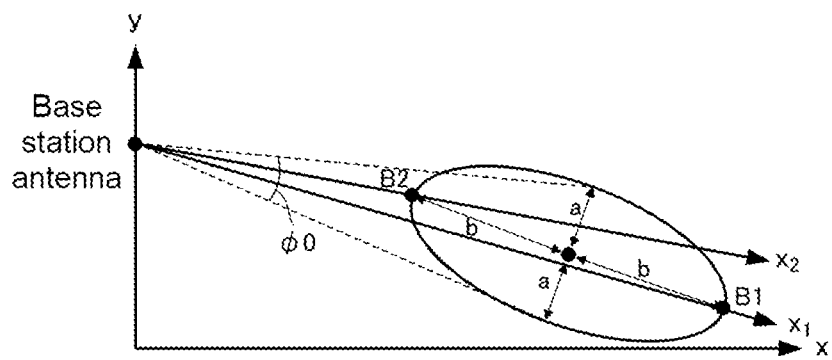
FIG. 9A is a graph for describing a horizontal beam width of the beam of the transmission signal.
Figure 9B:
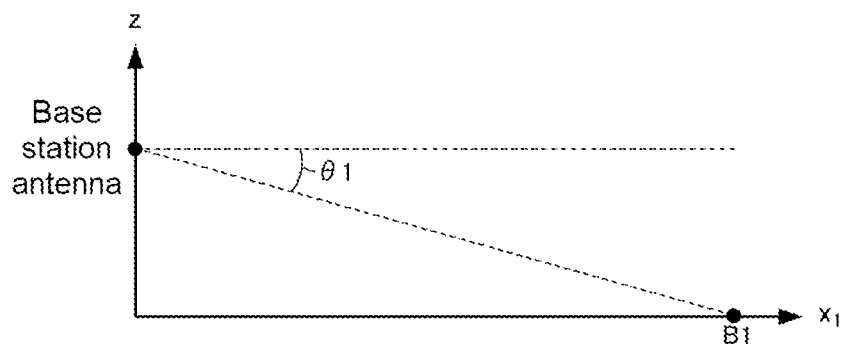
FIGS. 9B and 9C are graphs for explaining a vertical beam width of the beam of the transmission signal.
Figure 9C:
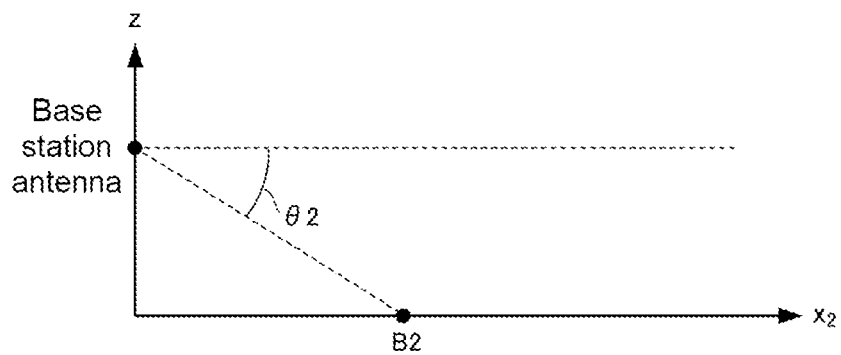

FIGS. 9A to 9C illustrate calculation examples of the beam width of the beam of the transmission signal by the beam width estimation unit 29. As illustrated in FIG. 9A, assuming that a view angle of the short axis of the ellipse obtained by the above fitting as viewed from the position where the base station antenna Tx is projected onto the xy plane is φ0, φ0 is the horizontal beam width.

FIG. 9A also illustrates an $x_1$ axis and an $x_2$ axis taken in a direction connecting the position of the base station antenna Tx projected on the xy plane, and both ends B1 and B2 of the long axis of the ellipse obtained by the above fitting. As illustrated in FIGS. 9B and 9C, when elevation/depression angles of the base station antenna Tx viewed from both the ends B1 and B2 in an $x_1z$ plane and an $x_2z$ plane are respectively set as θ1 and θ2, θ2−θ1 is the vertical beam width.

The signal processing device 20 is, for example, configured by a control device such as a computer including a central processing unit (CPU), a graphics processing unit (GPU), a field programmable gate array (FPGA), a read only memory (ROM), a random access memory (RAM), and a hard disk drive (HDD). For example, in the signal processing device 20, at least some of the signal synchronization unit 21, the reference signal extraction unit 22, the channel response generation unit 23, the arrival direction estimation unit 24, the base station position estimation unit 25, the reception power calculation unit 26, the power distribution calculation unit 27, the beam direction estimation unit 28, and the beam width estimation unit 29 can be configured by software in a manner that the CPU or the GPU executes a predetermined program. The above program is stored in the ROM or the HDD in advance. Alternatively, the above program may be provided or distributed in a state of being recorded on a computer-readable recording medium such as a compact disc or a DVD in an installable or executable form. Alternatively, the above program may be stored in a computer connected to a network such as the Internet, and provided or distributed by downloading the program via the network.

The display device 40 is configured, for example, by display equipment such as a liquid crystal display (LCD) or a cathode ray tube (CRT), and displays the estimation results of the azimuth angle, the elevation/depression angle, the horizontal beam width, and the vertical beam width of each beam based on a control signal from the signal processing device 20. Further, the display device 40 displays an operation target such as a button, a soft key, a pull-down menu, and a text box for setting various conditions.

The operation device 41 is for receiving a user operation input, and is configured by, for example, a touch panel including a touch sensor for detecting a contact position by a contact operation on an input surface corresponding to a display screen of the display device 40. Alternatively, the operation device 41 may include an input device such as a keyboard or mouse. For example, a user can perform an operation input to the operation device 41 to set the wavelength λ of the beam transmitted from the base station antenna Tx, the known antenna gain $G_r$ of the plurality of antenna elements Rx1 to RxN, and the like.

The effects of the estimation apparatus 1 according to the present embodiment will be confirmed by simulations below.

First, a beam having desired parameters (azimuth angle, elevation/depression angle, horizontal beam width, and vertical beam width) was generated by ray tracing simulation, and the reception power $P_r$ of the plurality of antenna elements Rx1 to RxN at each measurement point 30 was obtained. Here, it was assumed that the base station antenna Tx is installed on the roof of a building having a height of 11 m, and, a plurality of measurement points 30 were provided in a grid pattern in a measurement area MA assumed to be a communication area, as illustrated in FIG. 4. It was also assumed that the number of beams from the base station antenna Tx is 12.

Figure 10:
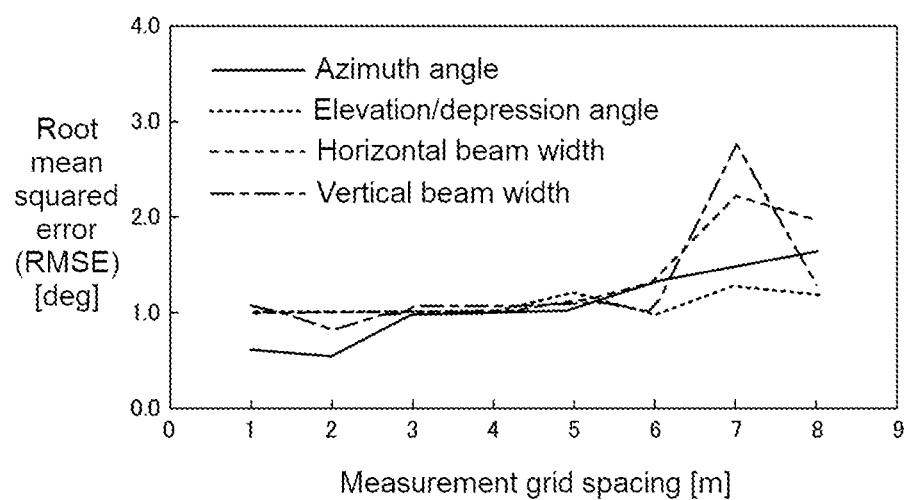
FIG. 10 is a graph showing an error between a parameter of the beam by ray tracing simulation and an estimation result of the parameter of the beam by the estimation apparatus according to the embodiment of the present invention.

In FIG. 10, an error between the result obtained in a manner that the parameter of a beam is estimated by the estimation method of the estimation apparatus 1 according to the present invention and the desired parameter of a beam generated by the ray tracing simulation is represented by the root mean squared error (RMSE) [deg] of 12 beams by using the reception power $P_r$ at each measurement point 30 generated by the ray tracing simulation. In this simulation, the grid spacing among the measurement points 30 is caused to vary in a range of 1 m to 8 m. From the results illustrated in FIG. 10, it was confirmed that the parameter of the beam can be estimated with an RMSE of about 1° if the grid spacing among the measurement points 30 is equal to or less than about 5 m.

Figure 11:
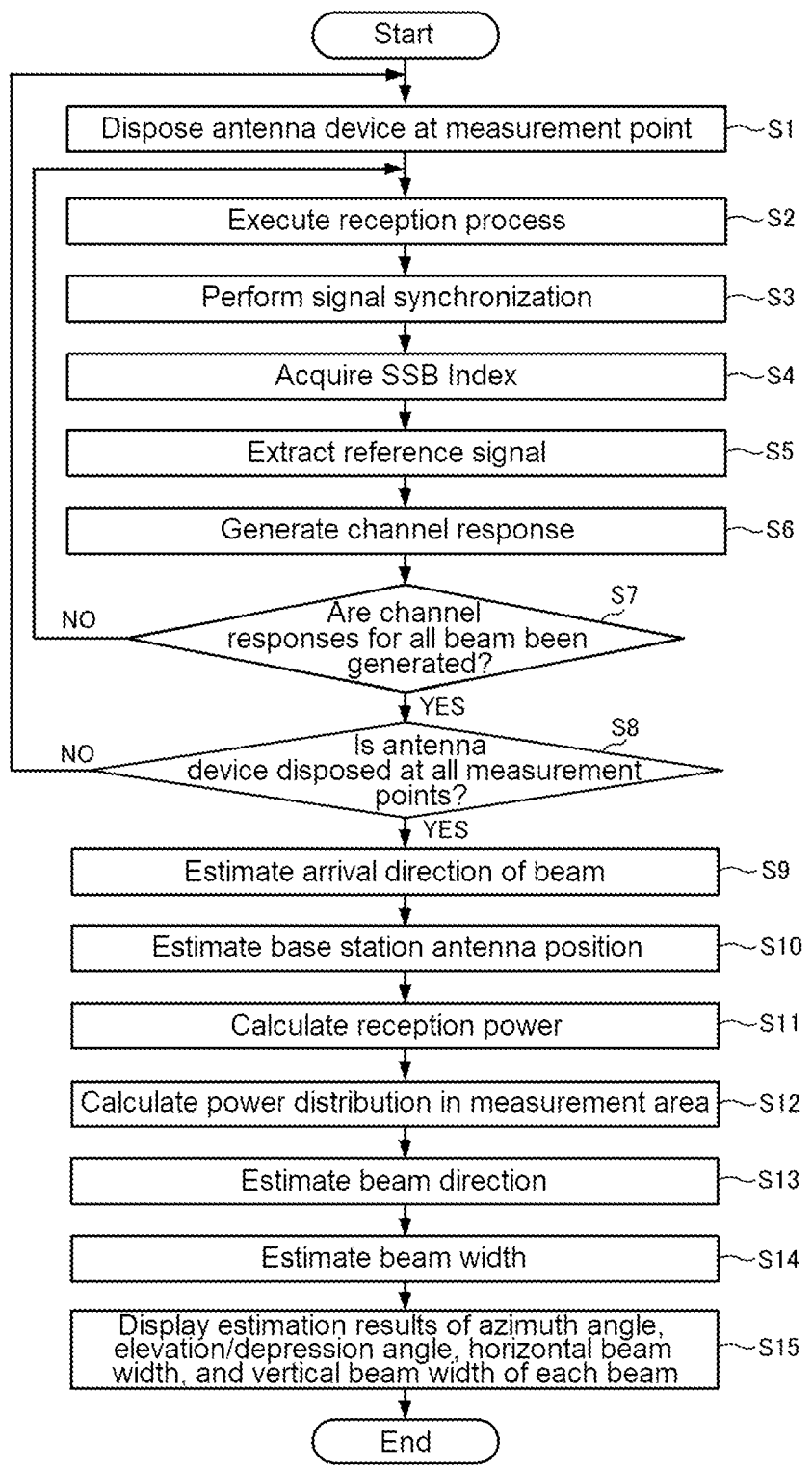
FIG. 11 is a flowchart for describing a process of an estimation method using the estimation apparatus according to the embodiment of the present invention.

An example of a process of the estimation method using the estimation apparatus 1 according to the present embodiment will be described below with reference to the flowchart of FIG. 11. In the following process, it is assumed that data of all beams at one measurement point 30 is acquired, and then the similar process is sequentially executed at other measurement points 30.

First, the antenna device 10 and the position and azimuth acquisition device 13 loaded on a drone or the like are disposed at one of a plurality of measurement points 30 in the measurement area MA (Step S1).

Then, the antenna device 10 receives a beam of a transmission signal transmitted from the base station antenna Tx as a reception signal by a plurality of antenna elements Rx1 to RxN, and executes a reception process such as amplification, frequency conversion, and analog-to-digital conversion on the reception signal (Step S2).

Then, the signal synchronization unit 21 performs at least one of time domain synchronization and frequency domain synchronization on the reception signal by using a synchronization signal included in the reception signal subjected to the reception process by the antenna device 10 and the corresponding known synchronization signal (signal synchronization step S3).

Then, the signal synchronization unit 21 acquires an SSB index for identifying an SSB based on a PBCH included in the SSB of the reception signal, and specifies the beam transmitted from the base station antenna Tx (Step S4).

Then, the reference signal extraction unit 22 extracts a reference signal included in the reception signal synchronized by the signal synchronization unit 21 (reference signal extraction step S5).

Then, the channel response generation unit 23 generates a channel response of the beam specified in Step S4 from the known reference signal included in the transmission signal transmitted from the base station antenna Tx and the reference signal extracted from the reception signal by the reference signal extraction step S5 (channel response generation step S6).

Then, the signal processing device 20 determines whether or not channel responses for all beams that may be transmitted from the base station antenna Tx have been generated in the channel response generation step S6. When the channel responses for all the beams have been generated in the channel response generation step S6 (Step S7: YES), the signal processing device 20 executes the processes of Step S8 and after Step S8. When the channel responses for all the beams have not been generated in the channel response generation step S6 (Step S7: NO), the signal processing device 20 executes the processes of Step S2 and after Step S2 again for beams for which channel responses have not yet been obtained.

Then, the signal processing device 20 determines whether or not the antenna device 10 and the position and azimuth acquisition device 13 are disposed at all the measurement points 30 in the measurement area MA. When the antenna device 10 and the position and azimuth acquisition device 13 are disposed at all the measurement points 30 in the measurement area MA (Step S8: YES), the signal processing device 20 executes the processes of Step S9 and after Step S9. When the antenna device 10 and the position and azimuth acquisition device 13 are not disposed at all the measurement points 30 in the measurement area MA (Step S8: NO), the signal processing device 20 executes the processes of Step S1 and after Step S1 again to dispose the antenna device 10 and the position and azimuth acquisition device 13 at the measurement point 30 at which the antenna device 10 and the position and azimuth acquisition device 13 have not been yet disposed.

Then, based on the channel response of each beam at each measurement point 30, which has been generated in the channel response generation step S6, the arrival direction estimation unit 24 calculates arrival direction characteristics of each beam of the transmission signal from the base station antenna Tx for each measurement point 30, and estimates an arrival direction in which the power level in the calculated arrival direction characteristics of each beam is highest, for each measurement point 30 (arrival direction estimation step S9).

The base station position estimation unit 25 estimates the position of the base station antenna Tx by using the arrival direction of each beam at each measurement point 30, which has been estimated in the arrival direction estimation step S9 (base station position estimation step S10).

The reception power calculation unit 26 calculates the maximum reception power $P_r$ among the plurality of antenna elements Rx1 to RxN at each measurement point 30 (reception power calculation step S11).

The power distribution calculation unit 27 calculates the maximum-value position that is the position of the maximum value of the power distribution $P_a$ of each beam in the measurement area MA and the beam boundary that is the position having power lower from the maximum value by 3 dB, based on the position of each measurement point 30 acquired by the position and azimuth acquisition device 13, the position of the base station antenna Tx estimated in the base station position estimation step S10, and the reception power $P_r$ calculated in the reception power calculation step S11 (power distribution calculation step S12).

Based on the position of the base station antenna Tx estimated in the base station position estimation step S10 and the maximum-value position of each beam calculated in the power distribution calculation step S12, the beam direction estimation unit 28 estimates the beam direction of each beam, that is, the azimuth angle and the elevation/depression angle of the maximum-value position of each beam viewed from the base station antenna Tx (beam direction estimation step S13).

The beam width estimation unit 29 estimates the beam width of the beam of the transmission signal, that is, the horizontal beam width and the vertical beam width in the xy plane in which there are the measurement points 30, based on the beam boundary of each beam calculated in the power distribution calculation step S12 (beam width estimation step S14).

Then, the display device 40 displays the estimation results of the azimuth angle, the elevation/depression angle, the horizontal beam width, and the vertical beam width of each beam (Step S15).

As described above, the estimation apparatus 1 according to the present embodiment estimates, for each measurement point 30, the arrival directions of a plurality of beams of a transmission signal transmitted from the base station antenna Tx, and estimates the position of the base station antenna Tx by using the estimated arrival directions of the plurality of beams. Here, the estimation apparatus 1 according to the present embodiment estimates the arrival direction of each beam with the highest power level for each measurement point 30. Furthermore, the estimation apparatus 1 according to the present embodiment estimates the beam direction and the beam width of each beam based on the position of the base station antenna Tx and the power distribution of each beam.

As a result, the estimation apparatus 1 according to the present embodiment can estimate the arrival direction of a direct wave of a transmission signal from the base station antenna Tx, and thus can estimate the beam direction and the beam width of a beam transmitted from the base station antenna Tx without pre-calculation using a map.

DESCRIPTION OF REFERENCE NUMERALS AND SIGNS

1 Estimation Apparatus
10 Antenna Device
11 Receiver
11-1 to 11-N Reception Unit
13 Position And Azimuth Acquisition Device
14 Data Recording Device
20 Signal Processing Device
21 Signal Synchronization Unit
22 Reference Signal Extraction Unit
23 Channel Response Generation Unit
24 Arrival Direction Estimation Unit
25 Base Station Position Estimation Unit
26 Reception Power Calculation Unit
27 Power Distribution Calculation Unit
28 Beam Direction Estimation Unit
29 Beam Width Estimation Unit
30, 30a, 30b, 30c Measurement Point
100 Base Station
Tx Base Station Antenna
Rx1 To RxN Antenna Element
MA Measurement Area

What is claimed is:
1. An estimation apparatus comprising:
an antenna device that includes a plurality of antenna elements (Rx1 to RxN) and receives a plurality of beams of a transmission signal transmitted from a base station antenna (Tx) as a reception signal by the plurality of antenna elements at a plurality of measurement points in a measurement area (MA);
a position and azimuth acquisition device that acquires a position and an azimuth of each of the measurement points at which the antenna device is disposed;
a data recording device that records data of the reception signal received by the antenna device disposed at each of the measurement points and data of the position and the azimuth of each of the measurement points acquired by the position and azimuth acquisition device; and a signal processing device that estimates a beam direction and a beam width of each of the beams from the data of the reception signal and the data of the position and the azimuth of each of the measurement points, which have been recorded in the data recording device, wherein the signal processing device includes
a reference signal extraction unit that extracts a reference signal included in the reception signal,
a channel response generation unit that generates a channel response of each of the beams from a known reference signal included in the transmission signal and the reference signal extracted from the reception signal by the reference signal extraction unit,
an arrival direction estimation unit that estimates an arrival direction of each of the beams with a highest power level, for each of the measurement points, based on the channel response of each of the beams generated by the channel response generation unit,
a base station position estimation unit that estimates a position of the base station antenna by using the arrival direction estimated by the arrival direction estimation unit,
a reception power calculation unit that calculates reception power of the plurality of antenna elements at each of the measurement points,
a power distribution calculation unit that calculates a maximum-value position and a beam boundary based on the position of each of the measurement points, the position of the base station antenna estimated by the base station position estimation unit, and the reception power calculated by the reception power calculation unit, the maximum-value position being a position at which a power distribution of each of the beams has a maximum value in the measurement area, and the beam boundary being a position at which a value of the power distribution is lower than the maximum value by 3 dB,
a beam direction estimation unit that estimates the beam direction of each of the beams based on the position of the base station antenna estimated by the base station position estimation unit and the maximum-value position of each of the beams calculated by the power distribution calculation unit, and
a beam width estimation unit that estimates the beam width of each of the beams based on the beam boundary of each of the beams calculated by the power distribution calculation unit.

2. The estimation apparatus according to claim 1, wherein the antenna device and the position and azimuth acquisition device are loaded on a drone, and
the antenna device and the position and azimuth acquisition device each are connected to the data recording device by wireless communication.

3. The estimation apparatus according to claim 1, wherein the antenna device, the position and azimuth acquisition device, and the data recording device are loaded on a drone, and
the data recording device and the signal processing device are connected by wireless communication.

4. The estimation apparatus according to claim 1, wherein the plurality of measurement points in the measurement area are located at positions of grid points provided in a grid pattern.

5. An estimation method using an estimation apparatus including an antenna device that includes a plurality of antenna elements (Rx1 to RxN) and receives a plurality of beams of a transmission signal transmitted from a base station antenna (Tx) as a reception signal by the plurality of antenna elements at a plurality of measurement points in a measurement area (MA), a position and azimuth acquisition device that acquires a position and an azimuth of each of the measurement points at which the antenna device is disposed, a data recording device that records data of the reception signal received by the antenna device disposed at each of the measurement points and data of the position and the azimuth of each of the measurement points acquired by the position and azimuth acquisition device, and a signal processing device that estimates a beam direction and a beam width of each of the beams from the data of the reception signal and the data of the position and the azimuth of each of the measurement points, which have been recorded in the data recording device, the estimation method comprising:

a reference signal extraction step of extracting a reference signal included in the reception signal;

a channel response generation step of generating a channel response of each of the beams from a known reference signal included in the transmission signal and the reference signal extracted from the reception signal in the reference signal extraction step;

an arrival direction estimation step of estimating an arrival direction of each of the beams with a highest power level, for each of the measurement points, based on the channel response of each of the beams generated in the channel response generation step;

a base station position estimation step of estimating a position of the base station antenna by using the arrival direction estimated in the arrival direction estimation step;

a reception power calculation step of calculating reception power of the plurality of antenna elements at each of the measurement points;

a power distribution calculation step of calculating a maximum-value position and a beam boundary based on the position of each of the measurement points, the position of the base station antenna estimated in the base station position estimation step, and the reception power calculated in the reception power calculation step, the maximum-value position being a position at which a power distribution of each of the beams has a maximum value in the measurement area, and the beam boundary being a position at which a value of the power distribution is lower than the maximum value by 3 dB;

a beam direction estimation step of estimating the beam direction of each of the beams based on the position of the base station antenna estimated in the base station position estimation step and the maximum-value position of each of the beams calculated in the power distribution calculation step; and a beam width estimation step of estimating the beam width of each of the beams based on the beam boundary of each of the beams calculated in the power distribution calculation step.

* * * * *